Figure 5:
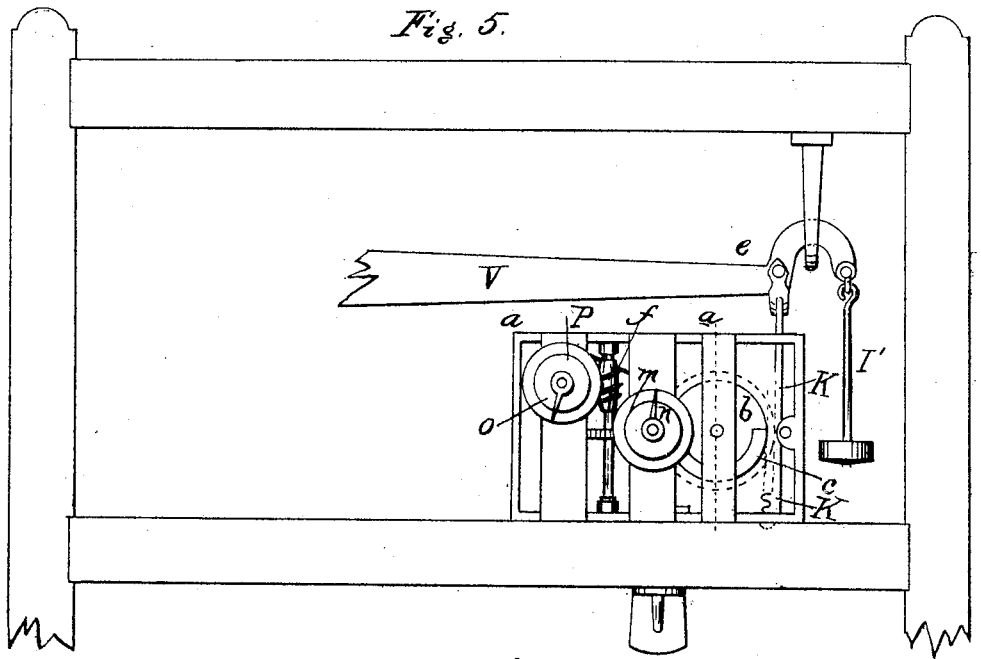

3 Sheets—Sheet 1.
C. C. LYMAN.
PLATFORM SCALE.
No. 103,478.  Patented May 24, 1870.
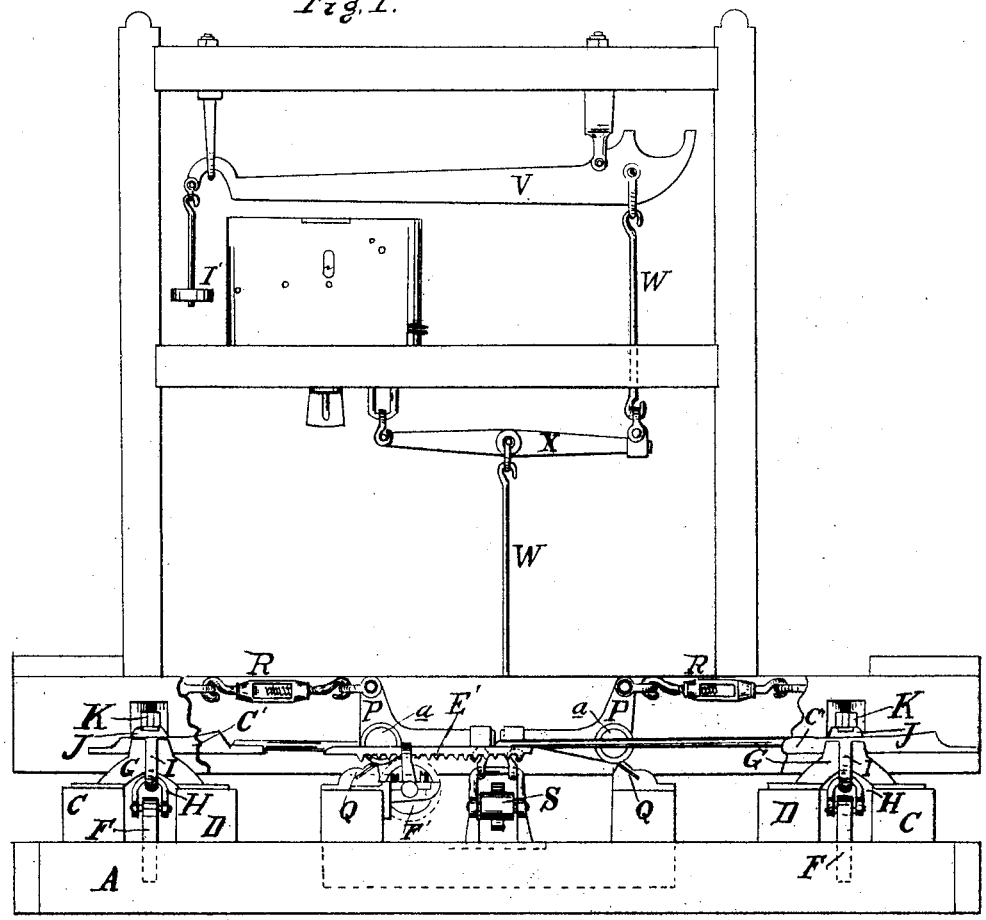
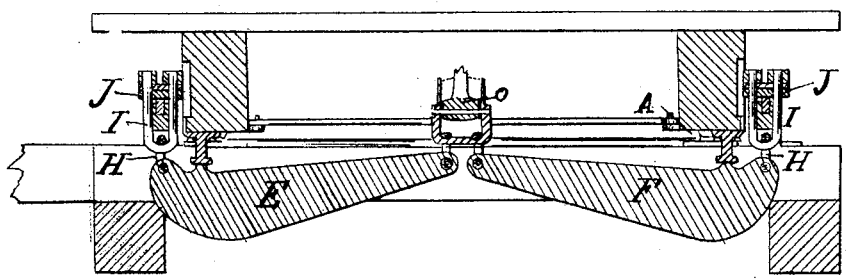
Witnesses  Inventor
J. H. Burridge  C. C. Lyman
Frank S. Alden  Per Burridge & Co. Attys.

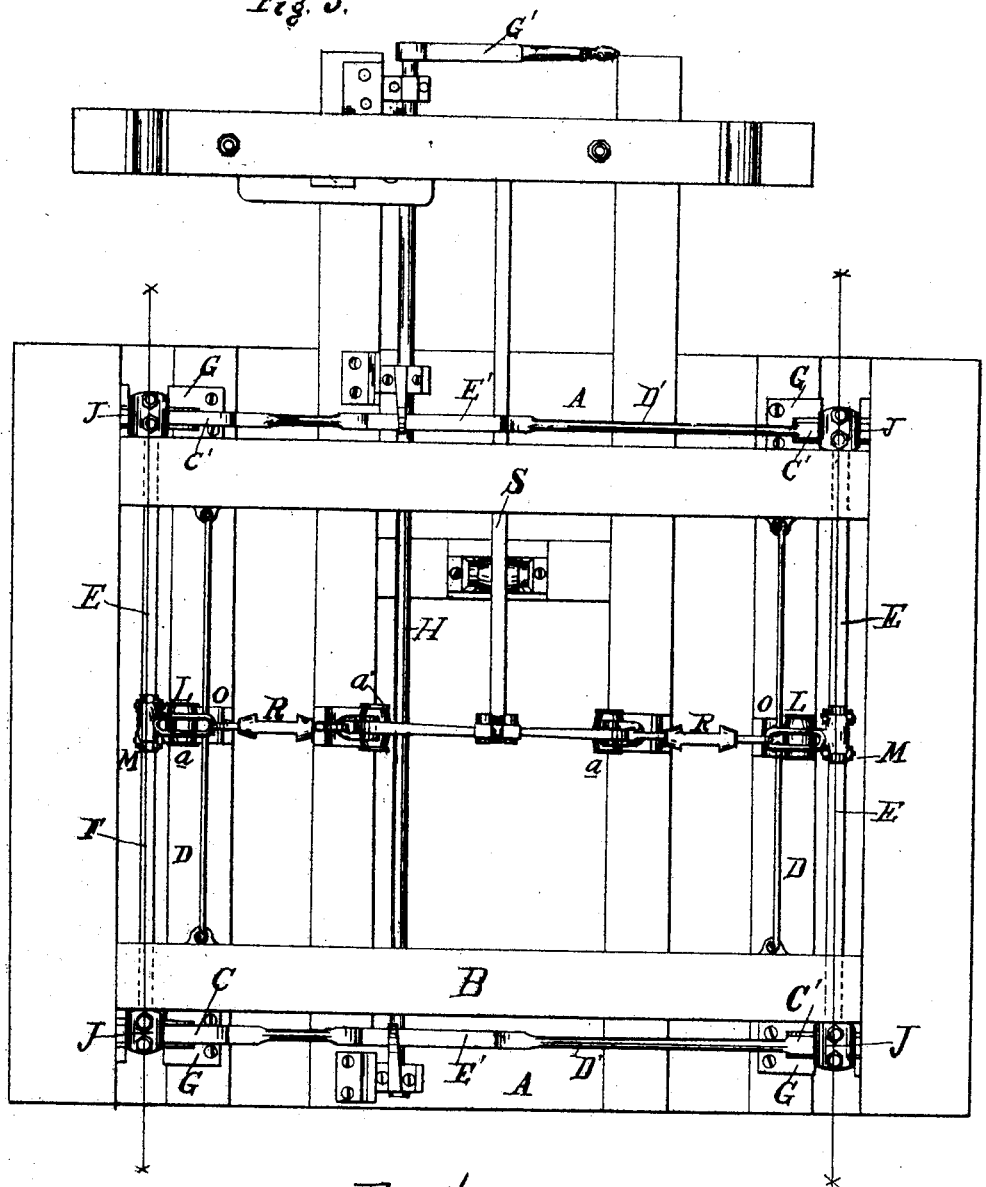
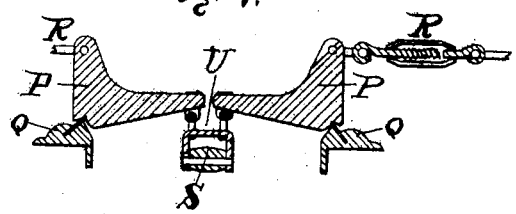

3 Sheets—Sheet 3.

C. C. LYMAN.
PLATFORM SCALE.

No. 103,478. Patented May 24, 1870.

Witnesses
J. H. Burridge
Frank S. Alden

Inventor
C. C. Lyman.
Per Burridge & Co. Attys.

United States Patent Office.

CHESTER C. LYMAN, OF EDINBOROUGH, PENNSYLVANIA.

Letters Patent No. 103,478, dated May 24, 1870.

IMPROVEMENT IN PLATFORM-SCALES.

The Schedule referred to in these Letters Patent and making part of the same.

*To all whom it may concern:*

Be it known that I, CHESTER C. LYMAN, of Edinborough, in the county of Erie and State of Pennsylvania, have invented a certain new and improved Platform-Scale; and I do hereby declare that the following is a full, clear, and complete description of the same, reference being had to the accompanying drawings making part of this specification, in which drawings—

Figure 1 is a side elevation of the scales.

Figure 2, a transverse section in direction of the line x x, fig. 3.

Figure 3 is a top view.

Figure 4, a detached transverse section.

Figures 5, 6, 7, 8, and 9 are detached sections to which reference will be made.

Like letters of reference refer to like parts in the several views.

Objective.

This invention relates to a pair of platform-scales, the construction of which being such that the platform thereof can be raised from the bed or frame in which it is arranged, or lowered therefrom, by means of a series of wedges or inclined planes, hereinafter more fully described. Also, by the aid of said wedges and certain yokes operated by screws, the platform may be adjusted to its seats or rests, so that it shall be perfectly level, and, therefore, rest upon its bearings without wrenching or any irregular strain being exerted upon it.

It also relates to a device attached to the scale-beam, by the use of which the weighing is done by a weight attached to the periphery of a cog-wheel, thereby dispensing with the use of the many separate weights in ordinary use. Said device also operates a register, whereby the weight of the article is indicated by a dial of notation and index, all of which is hereinafter more fully described.

Descriptive.

In the drawing, fig. 3—

A represents a top view of the frame or bed upon which the platform B rests when not in active use, and in which the several devices for raising and lowering the platform, &c., are arranged.

Said devices are as follows:

Between the cheeks of the sills C D, fig. 1, is adjusted a pair of levers, E F, fig. 3. The outer end of each lever is suspended from an arch or bridge, G, fig. 1, by means of a clevis, H, attached to a yoke, I, worn by and depending from the crown of the arch, as shown in the drawing. It will be observed that the ends of said yokes are held by a plate, J, resting loosely and transversely upon the crown of the arch, and secured to said plate by nuts K, the purpose and operation of which will presently be shown.

Figure 8:
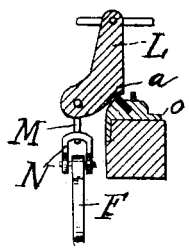

The inner end of each lever is attached to the lower arm of an angular lever, L, fig. 3, (a detached view of said lever is shown in fig. 8,) by means of a clevis connection, M N, whereby is obtained to the connection a freedom of movement.

In the under side of the elbow of said lever is formed a recess, a, fig. 1, into which the knife edge of the fulcrum O is received, as shown in figs. 4 and 8, and on which the lever rests and vibrates for actuating the levers E F.

P, fig. 1, are also angular levers, the elbows of which, in a like manner, are incurvated and vibrate upon an upturned knife-edge of the fulcrum Q, as shown in the transverse section, fig. 4.

The vertical arms of the levers P are attached to the vertical arms of the lever L by means of the adjusting links R, whereby the several levers are attached conjointly.

To the horizontal arms of the levers P is attached the inner end of the lever S, fig. 3, by means of a clevis connection, V, as shown in fig. 4.

The outer arm of said lever P is attached to the balance-beam V, fig. 1, by the links W and lever X, whereby the movement of the several levers is obtained, as will presently be shown.

On each corner of the under side of the platform is a foot-plate, A', fig. 2. A corresponding plate is secured to the sills immediately under the foot-plates, and on which the foot-plates rest for supporting the platform when not in active service. Also, from the under side of the platform depends a standard, B', fig. 2, the lower end of which stands upon the levers E F, as shown, and whereby the platform is elevated by the application of the following devices, viz: Immediately under the plates J, whereby the ends of the yokes I are secured, lies a long, slender wedge, C', fig. 3, having a longitudinal movement in grooves cut in the crown of the arch. The two companion wedges on each side of the platform are connected to each other by a link, D'. About midway in the said link is a toothed rack, E', worked by a pinion, F', fig. 1. A similar rack and pinion are provided for each pair of wedges, and are operated together by the lever G', fig. 3, secured to the shaft H', on which the pinions are secured.

The practical operation of this device for raising the platform is as follows:

The platform, as shown in fig. 1, is resting upon its seats, therefore not in actual use. Now, in order to raise it from its bearings, for the purpose of weighing, the operator lifts upward upon the lever G', thereby turning the pinions F', which will force the wedges C' under the yoke-plates, which, being free of the arch, will, in consequence, be raised upward, carrying with them the yokes, also the levers E F, attached thereto. As the levers ascend they push upward the platform, by means of the standards B', and upon which the platform is now borne upward by the levers until it is entirely free of its seats.

Figure 6:
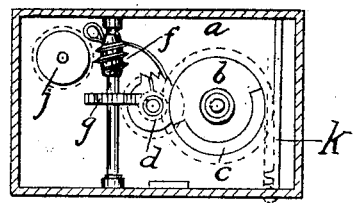
Figure 7:
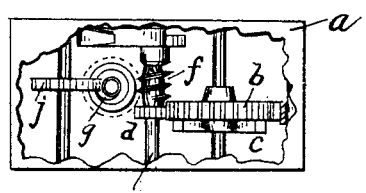
Figure 9:
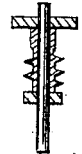

In this position of the platform the scale is in condition for weighing, as the platform is now entirely supported upon the levers E F, thereby balancing it and the load thereon upon the knife-edge of the fulcrum and elbow of the angular-levers, which, being properly attached to the lever S and scale-beam V, in the manner as above described, the weight of the load may now be readily obtained by the use of weights placed upon the pendulum I', in the ordinary way; but in this scale it is obtained by the following-described device:

Immediately below the scale-beam is a case, $a$, fig. 3, in which is disposed a system of wheels and screws, consisting of a primary cog-wheel or weight-wheel, $b$, around the peripheral side of which, to the extent of half its circumference, is a weight, $c$, figs. 6 and 7; into said wheel is geared a pinion, $d$, on the shaft $e$. On said shaft is a screw, $f$, which engages a wheel, $g$, fig. 6, having some twenty teeth. Near the end of the screw is a ratchet-wheel, $h$, and spring pawl, whereby said screw is prevented from reacting by the descent of the scale-beam, the screw being fitted loosely to the shaft by means of a sleeve, as shown in fig. 9. On the shaft $i$, carrying the wheel $g$, is a similar worm or screw, $f'$, engaging a wheel, $j$, also having some twenty teeth. The arrangement of said wheels and screws is fully shown in figs. 6 and 7.

The operation of the above-described device for weighing is as follows:

The scale-beam V is put in connection with the device by means of a sack, $k$, depending from the end of the beam at the point $l$, fig. 5, and which engages the cog-wheel $b$. It will be obvious that by this connection of the apparatus to the beam the vibration of the beam will actuate the primary wheel $b$, which, in turn, will give movement to the associated wheels above described. Let it be supposed that the platform is raised from its seats and balanced upon the knife-edges of the several levers, to procure a perfect poise of the scale. Weights, more or less in number, may be hung upon the pendulum. Now, when the object to be weighed is placed upon the platform, the beam will rise, thereby causing the primary wheel $b$ to turn more or less, according to the weight of the object. As the wheel turns the weight $c$ thereon will move around upward. The distance moved from its position shown in fig. 5 (that in which it exerts no influence upon the beam or scale but that of an equipoise) will measure the weight of the load upon the platform, and indicate the same on the dial $m$, fig. 5, which may have a scale of weight thereon by the index-point $n$. If the weight on the wheel represents four hundred pounds, it will be obvious that when the wheel shall be moved one-quarter the way round to the point of its greatest capacity, as indicated by the lines $a$, fig. 5, the index will move accordingly, and indicate the same on the dial as the weight of the load, or will indicate any fractional part of the load less than four hundred pounds. The excess of the weight of the load over four hundred pounds will be obtained by the addition of weight on the pendulum.

This apparatus is also useful in showing the fractional difference between one or more loads, as, for instance, a train of cars, of which we will suppose the lightest to weigh twenty tons. In such a case a weight representing twenty tons may be placed upon the scale-beam in the usual manner, and the weight or counter-balance $c$ on the wheel $b$, when moved upward one-fourth of a circle, showing its greatest weight, which may represent five thousand pounds or less, according to its upward movement. We will suppose the counterbalance to be the only weight used, and that its greatest capacity is four thousand pounds, which will be shown by the index $n$ of the dial $m$, or less, according to the distance that the weight may move. Now, if the weight C is carried by the beam one-quarter of the way around, indicating in the dial four thousand pounds, one revolution of the screw $f$ would cause the wheel $g$ to turn just one notch, representing four thousand pounds, and said wheel having twenty teeth, one revolution thereof, multiplied by four thousand, would give eighty thousand pounds, and as the screw $f'$ is moved one-twentieth of a revolution by the wheel $g$, so will the wheel $j$ be turned correspondingly, which, in making one revolution, would show twenty times eighty thousand, equal to sixteen hundred thousand, indicated by one revolution of the index V of the dial P. By this means the several cars weighing the supposed twenty tons would pass over the platform without affecting the beam, whereas, on the passing over of each car which may have an excess of twenty tons, such excess will be accounted for by the movement of the counterbalance weight, be it more or less, up to four thousand, and registered on the dial $m$, and the aggregate of all such excess of several cars will be shown by the dial $p$.

Having thus described the construction and operation of the scales, I will now speak of the peculiar advantages it has over others.

The special purpose of this scale is for weighing trains of cars while in motion; hence the necessity of the device for raising and lowering the platform, which, when not in active use, is lowered upon its seats, thereby relieving the scale-bearings from the weight of the platform and trains of cars that may be run over it, the weight of which may not be required.

Also, the scale may be set in the main track, and be repeatedly passed over by the engine, &c., without injury to the scales or in the least interfering with or injuring the track. Hence the scale may be placed in the most convenient point to weigh, thereby saving the expense of building a side track and the inconvenience and time of switching into a side track for weighing.

The arrangement of the devices for raising and lowering the platform are operated from one point, viz., by the hand-lever, thereby making the matter of adjusting the platform very convenient to the weighmaster, and as the platform is raised at once and from each corner, its adjustment is exact and uniformly accomplished.

It sometimes happens that ice, coal, mud, or snow, &c., lodge between the bed-timbers of the scale and that of the platform, and not unfrequently freezing, and obstructing the movement of the platform, in which case, if the platform required to be lowered in order to come in contact with the weighing-levers, it would press upon said obstructions all the more, and, therefore, increase the difficulty, whereas, if the platform were raised upward by the moving levers, as in my scale, it would be lifted up away from such obstructions, and, therefore, the scale would weigh without restraint in the freedom of its movements.

In consequence of the angular lever above described having a concave bearing, and resting upon a stationary edge, as shown in the drawings, said edge is wholly protected from coal, dust, mud, ice, rains, or snow, and hence will at all times move without embarrassment of the presence of such obstructions, which, in the ordinary scale in use, proves to be a serious source of trouble and hindrance to a free movement of the central connections of railroad and other publicly-exposed scales.

By inverting the bearings in the manner as above shown, and covering them with the concave of the lever, and sealing the sides with cheek-pieces or plates, the bearings are rendered perfectly secure from any of the above-instanced obstructions, and the levers are also secured from all possible lateral movement or displacement.

The manner adopted for connecting the angular lever to the transverse levers, at the bottom, affords a cheaper and better means of lengthening or changing the length of the scale than by any other means now in use.

I am aware that knife-edges fixed in scale-levers often have the sharp edges extend upward, having clevises, yokes, and saddles of various forms resting thereon. This I do not claim. But I am not aware that there are any scales in use having the concave in the lever resting upon a fixed edge in the manner as above described and set forth; therefore,

What I claim as my invention, and desire to secure by Letters Patent, is—

1. The wedges or inclined planes C', as arranged and operated, in combination with the plates J of the yokes I, for the purpose of elevating the levers E F, and bringing their knife-edges into bearing contact with the feet of the platform, in the manner substantially as described and set forth.

2. The weighted wheel $b$, as arranged in relation to and in combination with the scale-beam V, and co-operating therewith, in the manner as and for the purpose set forth.

3. The arrangement and combination of the weighted wheel $b$, pinion $d$, screw $f$, wheel $g$, screw $f'$, and wheel $j$, all constructed and arranged to operate substantially as described, for the purpose specified.

CHESTER C. LYMAN.

Witnesses:
W. H. BURRIDGE,
FRANK S. ALDEN.